US012569997B2

(12) United States Patent
Kim et al.

(10) Patent No.: US 12,569,997 B2
(45) Date of Patent: Mar. 10, 2026

(54) METHOD OF GENERATING ROBOT PATH AND COMPUTING DEVICE FOR PERFORMING THE METHOD

(71) Applicant: Ewha University—Industry Collaboration Foundation, Seoul (KR)

(72) Inventors: Young Jun Kim, Seoul (KR); Daeun Song, Seoul (KR)

(73) Assignee: Ewha University—Industry Collaboration Foundation, Seoul (KR)

( * ) Notice: Subject to any disclaimer, the term of this patent is extended or adjusted under 35 U.S.C. 154(b) by 149 days.

(21) Appl. No.: 18/639,891

(22) Filed: Apr. 18, 2024

(65) Prior Publication Data

US 2025/0135640 A1     May 1, 2025

(30) Foreign Application Priority Data

Oct. 31, 2023     (KR) ........................ 10-2023-0147884

(51) Int. Cl.
| | |
|---|---|
| *B25J 9/16* | (2006.01) |
| *G06T 7/60* | (2017.01) |
| *G06T 7/73* | (2017.01) |

(52) U.S. Cl.
CPC ............... B25J 9/1664 (2013.01); G06T 7/60 (2013.01); G06T 7/73 (2017.01)

(58) Field of Classification Search
None
See application file for complete search history.

(56) References Cited

U.S. PATENT DOCUMENTS

| | | | |
|---|---|---|---|
| 9,266,353 B2 | 2/2016 | Beier | |
| 10,532,561 B2 | 1/2020 | Ingram et al. | |
| 2009/0266353 A1 | 10/2009 | Lee | |
| 2018/0001479 A1* | 1/2018 | Li | B25J 13/089 |

(Continued)

FOREIGN PATENT DOCUMENTS

| | | | |
|---|---|---|---|
| JP | 2003275473 A | * | 9/2003 |
| KR | 20210048415 A | | 5/2021 |

OTHER PUBLICATIONS

J. H. M. Lam, K. W. Lo and Y. Yam, "Robot Drawing Techniques for Contoured Surface Using an Automated Sketching Platform," 2007 IEEE International Conference on Automation Science and Engineering, Scottsdale, AZ, USA, 2007, pp. 735-740 (Year: 2007).*

(Continued)

*Primary Examiner* — Khoi H Tran
*Assistant Examiner* — Dairon Estevez
(74) *Attorney, Agent, or Firm* — Workman Nydegger

(57) ABSTRACT

A method of generating a robot path is provided. The method includes identifying a drawing pose set for a manipulator included in a robot in order to draw a two-dimensional (2D) image on a three-dimensional (3D) target surface, setting a profile curve by projecting surface points of the 3D target surface onto an xy-plane, determining coverage circles of the manipulator that are capable of covering all surface points of the profile curve, deriving bounding circles for a mobile platform of the robot mounting the manipulator, corresponding to each of the determined coverage circles, and generating a translation path of the robot for drawing the 2D image on the 3D target surface based on the derived bounding circles.

18 Claims, 9 Drawing Sheets

(56)            References Cited

U.S. PATENT DOCUMENTS

| | | | |
|---|---|---|---|
| 2018/0307207 A1* | 10/2018 | Atherton | ............... B29C 64/386 |
| 2021/0113193 A1 | 4/2021 | Heinz et al. | |
| 2022/0032468 A1* | 2/2022 | Tellex | .................. B25J 11/0075 |
| 2024/0051692 A1* | 2/2024 | Robèrt | ................... B25J 11/005 |
| 2025/0033211 A1* | 1/2025 | McGovern | ............. B25J 9/1664 |

OTHER PUBLICATIONS

R. Liu, W. Wan, K. Koyama and K. Harada, "Robust Robotic 3-D Drawing Using Closed-Loop Planning and Online Picked Pens," in IEEE Transactions on Robotics, vol. 38, No. 3, pp. 1773-1792, Jun. 2022 (Year: 2022).*

B. H. Jafari and N. Gans, "Surface Parameterization and Trajectory Generation on Regular Surfaces With Application in Robot-Guided Deposition Printing," in IEEE Robotics and Automation Letters, vol. 5, No. 4, pp. 6113-6120, Oct. 2020 (Year: 2020).*

Office Action received for Korean Patent Application No. 10-2023-0147884, mailed on Aug. 14. 2025, 11 pages (6 pages of English Translation and 5 pages of Original Document).

Screen captures from YouTube video clip entitled "SSK: Robotic Pen-Art System forLarge, Non-Planar Canvas" uploaded on Apr. 23, 2023 by user EwhaGlab. Retrieved from Internet: https://www.youtube.com/watch?v=TEfqbPNdoBY; 3 pages.

Song, Daeun. "SSK: Robotic Pen-Art System for Large, Nonplanar Canvas", Published May 2, 2023; IEEE Transactions on Robotics, vol. 39, No. 4, Aug. 2023; 15 pages.

Song et al., "SSK: Robotic Pen-Art System for Large, Nonplanar Canvas", retrieved from http://graphics.ewha.ac.kr/SSK/, last updated May 25, 2023; 2 pages.

"Ewha Womans University holds media art CO-DRAW exhibition using robots", Professor Newspaper, retrieved from https://www.kyosu.net/news/articleView.html?idxno=104518; accessed May 10, 2023; 1 page.

* cited by examiner

METHOD OF GENERATING ROBOT PATH AND COMPUTING DEVICE FOR PERFORMING THE METHOD

CROSS-REFERENCE TO RELATED APPLICATION

This application claims the benefit of Korean Patent Application No. 10-2023-0147884 filed on Oct. 31, 2023, in the Korean Intellectual Property Office, the entire disclosure of which is incorporated herein by reference for all purposes.

BACKGROUND

1. Field of the Invention

One or more embodiments relate to a method of generating a robot path, and more particularly, to a method of generating a translation path of a robot for drawing a two-dimensional (2D) image on a non-planar three-dimensional (3D) surface and a computing device for performing the method.

2. Description of the Related Art

Recently, with the remarkable development of robot technology, "robotic art" has become popular among both artists and robot engineers. Communities related to robotic art have presented a lot of fully autonomous or semi-autonomous robot drawing systems in the past. However, creating an autonomous robot drawing system is as difficult as creating any other autonomous robot systems as the autonomous robot drawing system requires robust components consisting of control, detection, planning, and a human-robot interface.

In addition, most of existing robot drawing systems are limited to a plane canvas. Drawing on a non-planar canvas requires mapping a two-dimensional (2D) drawing path of a 2D image to a three-dimensional (3D) drawing path on a target canvas surface without introducing any visual artistry. Therefore, a reliable and distortion-free method is needed for mapping between a 2D drawing path space and a 3D drawing path space of the target canvas surface.

In addition, the existing robot drawing systems may have a limitation on the size of a drawing canvas due to a limitation of the reach distance of a manipulator of a drawing robot. To solve this issue, a robot drawing system requires using a mobile platform that mounts a manipulator. However, using the mobile platform creates an additional task of navigation planning.

SUMMARY

Embodiments provide a method and apparatus for drawing a two-dimensional (2D) image on a non-planar three-dimensional (3D) surface with minimal distortion.

In addition, embodiments provide a method and apparatus for generating a translation path of a robot consisting of a manipulator and a mobile platform to draw a 2D image on a large, non-planar 3D surface.

However, the technical aspects are not limited to the aforementioned aspects, and other technical aspects may be present.

According to an aspect, there is provided a method of generating a robot path including identifying a drawing pose set for a manipulator included in a robot in order to draw a two-dimensional (2D) image on a three-dimensional (3D) target surface, setting a profile curve by projecting surface points of the 3D target surface onto an xy-plane, determining coverage circles of the manipulator that are capable of covering all surface points of the profile curve, deriving bounding circles for a mobile platform of the robot mounting the manipulator, corresponding to each of the determined coverage circles, and generating a translation path of the robot for drawing the 2D image on the 3D target surface based on the derived bounding circles.

The identifying of the drawing pose set may include identifying 2D drawing data for the 2D image, converting the 3D target surface to a 2D parametric domain, mapping all drawing points included in the 2D drawing data to the 2D parametric domain, and determining a drawing pose set of the manipulator by inverting the 2D parametric domain to which all of the drawing points are mapped to the 3D target surface.

The mapping of all of the drawing points to the 2D parametric domain may include identifying, corresponding to a missing drawing point of the 2D drawing data, four nearest matching drawing points that form a quadrilateral in the 2D parametric domain, wherein the missing drawing point is a point that is not mapped to the 2D parametric domain, and determining a drawing pose set for the manipulator of the robot by parameterizing the missing drawing point by applying bilinear interpolation to a quadrilateral formed by the identified four nearest matching drawing points.

The determining of the coverage circles of the manipulator may include identifying a plurality of coverage circle candidates that is capable of covering all of the surface points of the profile curve and selecting final coverage circles for generating the robot path from among the identified plurality of coverage circle candidates based on a number of surface points of the profile curve included in each of the identified plurality of coverage circle candidates.

The deriving of the bounding circles may include determining a center of a bounding circle for the mobile platform to be in a direction perpendicular to a line connecting two endpoints among surface points of the profile curve included in each of the determined coverage circles.

In the mobile platform, a pose direction may be determined based on the direction perpendicular to the line connecting the two endpoints.

The generating of the translation path of the robot may include determining a line connecting centers of each of the derived bounding circles for the mobile platform to be the translation path of the robot.

According to another aspect, there is provided a method of generating a robot path including identifying a drawing pose set for a manipulator included in a robot in order to draw a two-dimensional (2D) image on a three-dimensional (3D) target surface, setting a profile curve by projecting surface points of the 3D target surface onto an xy-plane, identifying a plurality of coverage circle candidates that is capable of covering all surface points of the profile curve, selecting, from among the identified plurality of coverage circle candidates, a first coverage circle candidate that includes a greatest number of surface points of the profile curve, selecting a second coverage circle candidate that includes a greatest number of surface points among surface points of the profile curve other than surface points included in the first coverage circle candidate, iterating the selecting of the first and second coverage circle candidates until coverage circle candidates capable of covering all of the surface points of the profile curve are selected, deriving bounding circles for a mobile platform of the robot mounting the manipulator, corresponding to each of final coverage circles selected through the iteration, and generating a translation path of the robot for drawing the 2D image on the 3D target surface based on the derived bounding circles.

The identifying of the drawing pose set may include identifying 2D drawing data for the 2D image, converting the 3D target surface to a 2D parametric domain, mapping all drawing points included in the 2D drawing data to the 2D parametric domain, and determining a drawing pose set of the manipulator by inverting the 2D parametric domain to which all of the drawing points are mapped to the 3D target surface.

The deriving of the bounding circles may include determining a center of a bounding circle for the mobile platform to be in a direction perpendicular to a line connecting two endpoints among surface points of the profile curve included in each of the determined coverage circles.

In the mobile platform, a pose direction may be determined based on the direction perpendicular to the line connecting the two endpoints.

According to another aspect, there is provided a computing device including at least one processor and a memory configured to load or store a program executed by the processor, wherein the program includes instructions that, when executed by the processor, cause the processor to identify a drawing pose set for a manipulator included in a robot in order to draw a two-dimensional (2D) image on a three-dimensional (3D) target surface, set a profile curve by projecting surface points of the 3D target surface onto an xy-plane, determine coverage circles of the manipulator that are capable of covering all surface points of the profile curve, derive bounding circles for a mobile platform of the robot mounting the manipulator, corresponding to each of the determined coverage circles, and generate a translation path of the robot for drawing the 2D image on the 3D target surface based on the derived bounding circles.

The processor may be configured to identify 2D drawing data for the 2D image, convert the 3D target surface to a 2D parametric domain, map all drawing points included in the 2D drawing data to the 2D parametric domain, and determine a drawing pose set of the manipulator by inverting the 2D parametric domain to which all of the drawing points are mapped to the 3D target surface.

The processor may be further configured to identify, corresponding to a missing drawing point of the 2D drawing data, four nearest matching drawing points that form a quadrilateral in the 2D parametric domain, wherein the missing drawing point may be a point that is not mapped to the 2D parametric domain, and to determine a drawing pose set for the manipulator of the robot by parameterizing the missing drawing point by applying bilinear interpolation to a quadrilateral formed by the identified four nearest matching drawing points.

The processor may be further configured to identify a plurality of coverage circle candidates that is capable of covering all of the surface points of the profile curve and to select final coverage circles for generating the robot path among the identified plurality of coverage circle candidates based on a number of surface points of the profile curve included in each of the identified plurality of coverage circle candidates.

The processor may be further configured to determine a center of a bounding circle for the mobile platform to be in a direction perpendicular to a line connecting two endpoints among surface points of the profile curve included in each of the determined coverage circles.

In the mobile platform, a pose direction may be determined based on the direction perpendicular to the line connecting the two endpoints.

The processor may be further configured to determine a line connecting centers of each of the derived bounding circles for the mobile platform to be the translation path of the robot.

Additional aspects of embodiments will be set forth in part in the description which follows and, in part, will be apparent from the description, or may be learned by practice of the disclosure.

According to embodiments, a 2D image may be drawn on a non-planar 3D surface with minimal distortion.

In addition, according to embodiments, a translation path of a robot consisting of a manipulator and a mobile platform may be generated to draw a 2D image on a large, non-planar 3D surface.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
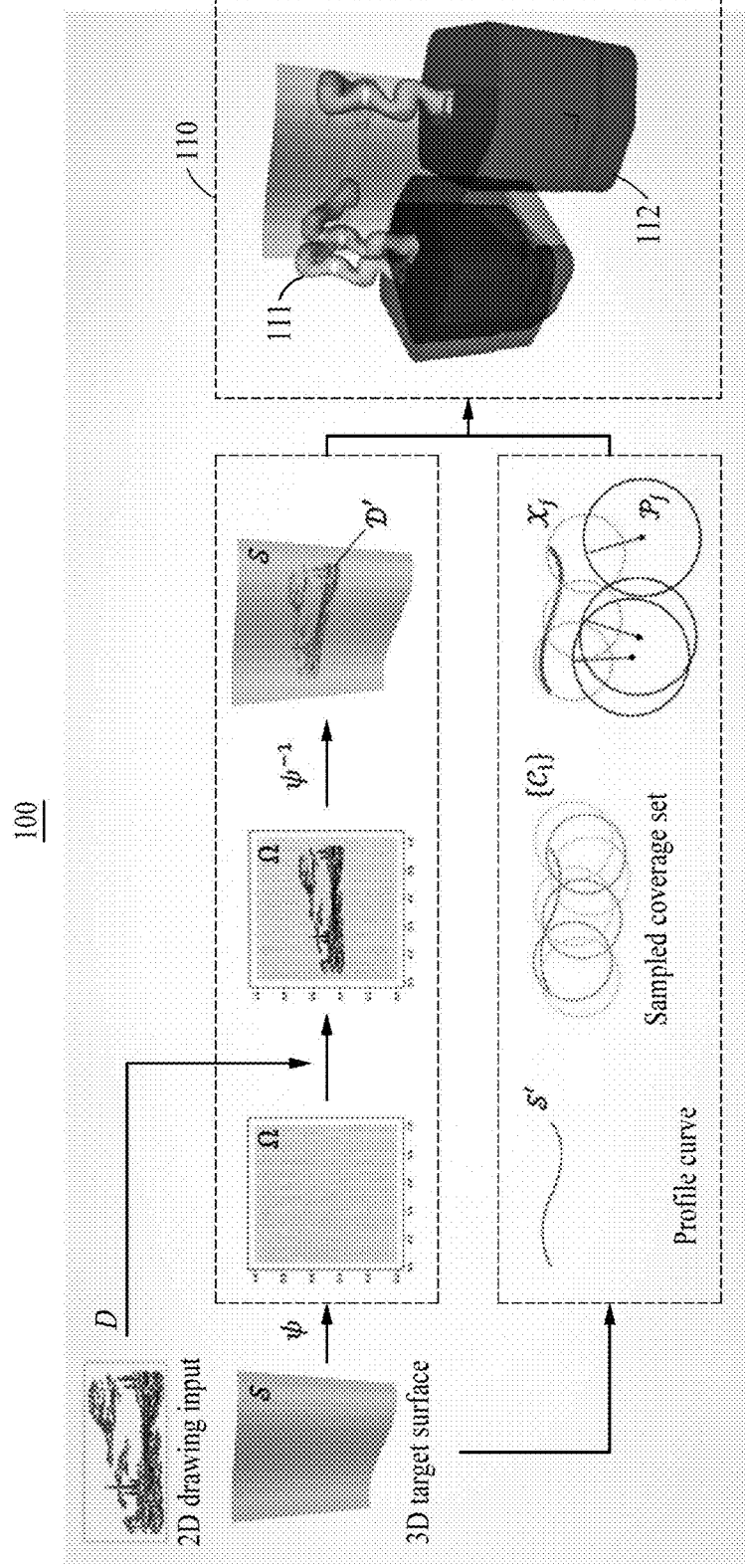
FIG. 1 is a diagram illustrating a robot drawing system according to an embodiment.

The following structural or functional description of examples is provided as an example only and various alterations and modifications may be made to the examples. Thus, an actual form of implementation is not construed as limited to the examples described herein and should be understood to include all changes, equivalents, and replacements within the idea and the technical scope of the disclosure.

Although terms such as first, second, and the like are used to describe various components, the components are not limited to the terms. These terms should be used only to distinguish one component from another component. For example, a "first" component may be referred to as a "second" component, and similarly, the "second" component may also be referred to as the "first" component.

It should be noted that when one component is described as being "connected," "coupled," or "joined" to another component, the first component may be directly connected, coupled, or joined to the second component, or a third component may be "connected," "coupled," or "joined" between the first and second components.

The singular forms "a," "an," and "the" are intended to include the plural forms as well, unless the context clearly indicates otherwise. As used herein, each of "A or B," "at least one of A and B," "at least one of A or B," "A, B, or C," "at least one of A, B, and C," "at least one of A, B, or C," and the like may include any one of the items listed together in the corresponding one of the phrases, or all possible combinations thereof. It will be further understood that the terms "comprises/comprising" and/or "includes/including," when used herein, specify the presence of stated features, integers, steps, operations, elements, and/or components, but do not preclude the presence or addition of one or more other features, integers, steps, operations, elements, components and/or groups thereof.

Unless otherwise defined, all terms used herein including technical and scientific terms have the same meanings as those commonly understood by one of ordinary skill in the art to which this disclosure pertains. Terms such as those defined in commonly used dictionaries are to be interpreted as having a meaning that is consistent with their meaning in the context of the relevant art and are not to be interpreted in an idealized or overly formal sense unless expressly so defined herein.

Hereinafter, the examples are described in detail with reference to the accompanying drawings. When describing the examples with reference to the accompanying drawings, like reference numerals refer to like components and a repeated description related thereto is omitted.

FIG. 1 is a diagram illustrating a robot drawing system according to an embodiment.

Referring to FIG. 1, using a robot 110, a robot drawing system 100 may provide a method of drawing a two-dimensional (2D) image (i.e., a 2D drawing input) on a three-dimensional (3D) target surface with minimal distortion. Here, the robot 110 of the robot drawing system 100 may include a manipulator 111 capable of drawing the 2D image on the 3D target surface and a mobile platform 112 that provides mobility to the manipulator 111.

First, the robot drawing system 100 may collect 2D drawing data $\mathcal{D} \subset \mathbb{R}^2$ including drawing points that are present on a drawing path of the 2D image. More specifically, the robot drawing system 100 may collect, via a user device such as a tablet or a mobile phone, the 2D drawing data $\mathcal{D}$ including a sequence of drawing points that define quadratic Bézier curve patches.

When 3D surface data $S \subset \mathbb{R}^3$ including surface points for the 3D target surface in the format of a mesh or a point cloud is provided, the robot drawing system 100 may estimate a normal vector for each surface point included in the 3D surface data S. Here, the estimated normal vector may be used to determine a direction of an end effector of the robot 110 and conformal mapping.

The robot drawing system 100 may parameterize $\psi : S \subset \mathbb{R}^3 \to \Omega \subset \mathbb{R}^2$ the 3D surface data S on the 3D target surface into a 2D parametric domain $\Omega$ through a parameterization function $\psi$.

The robot drawing system 100 may obtain a drawing pose set $\mathcal{D}' \subset SE(3)$ of the manipulator 111 to be mapped to the 3D target surface by mapping the 2D drawing data $\mathcal{D}$ to the 2D parametric domain $\Omega$ and reverse-mapping $\psi^{-1}$ the 2D parametric domain $\Omega$, to which the 2D drawing data $\mathcal{D}$ is mapped, to the 3D surface data S. Here, SE stands for special Euclidean group and indicates a group that may present a movement of a rigid body through 3D rotation and translation.

The robot drawing system 100 may not have a limitation on a size of the 3D target surface to be drawn because the mobile platform 112 provides mobility. Therefore, it is necessary to generate a translation path of the robot 110 for drawing the 2D image on the 3D target surface.

To this end, the robot drawing system 100 may identify a discrete coverage set of the robot 110 that covers the entire drawing path by introducing a concept of coverage of the robot 110. Thereafter, the robot drawing system 100 may divide the 2D image into a plurality of sub-drawings according to the identified discrete coverage set and may render the 2D image on the 3D target surface using impedance control for each of the plurality of divided sub-drawings.

Figure 2:
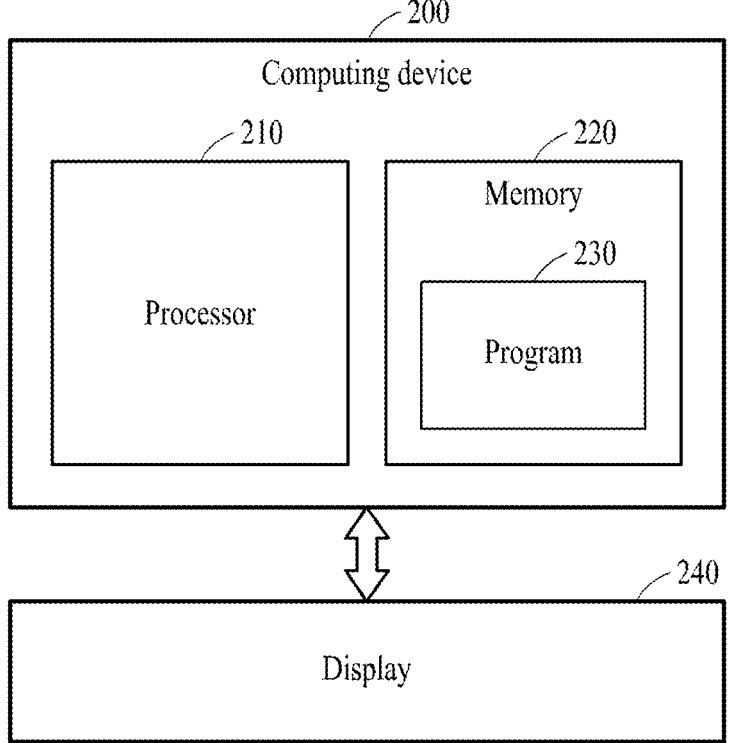
FIG. 2 is a diagram illustrating a configuration of a computing device according to an embodiment.

FIG. 2 is a diagram illustrating a configuration of a computing device according to an embodiment.

Referring to FIG. 2, a computing device 200 may include at least one processor 210 and a memory 220 for loading or storing a program 230 performed by the processor 210. The components included in the computing device 200 of FIG. 2 are only an example, and one of ordinary skill in the art may understand that other generally used components may further be included than the components shown in FIG. 2.

The processor 210 may control an overall operation of each component of the computing device 200. The processor 210 may include at least one of a central processing unit (CPU), a microprocessor unit (MPU), a microcontroller unit (MCU), a graphics processing unit (GPU), a neural processing unit (NPU), a digital signal processor (DSP), or other types of well-known processors in a relevant field of technology. In addition, the processor 210 may perform an operation of at least one application or program to perform the methods/operations described herein according to embodiments. The computing device 200 may include one or more processors.

The memory 220 may store one of, or a combination of two or more of, various pieces of data, instructions, and pieces of information that are used by a component (e.g., the processor 210) included in the computing device 200. The memory 220 may include a volatile memory or a nonvolatile memory.

The program 230 may include one or more actions implementing the methods/operations described herein according to the embodiments and may be stored in the memory 220 as software. In this case, an operation may correspond to an instruction that is implemented in the program 230. For example, the program 230 may include instructions that may cause the processor 210 to identify a drawing pose set for a manipulator included in a robot in order to draw a 2D image on a surface of a 3D target surface, to define a profile curve by projecting surface points of the 3D target surface onto an xy-plane, to determine coverage circles of the manipulator that may cover all surface points of the profile curve, to derive bounding circles for a mobile platform of the robot mounting the manipulator corresponding to each of the determined coverage circles, and to generate a translation path of the robot for drawing the 2D image on the 3D target surface based on the derived bounding circles.

When the program 230 is loaded in the memory 220, the processor 210 may execute a plurality of operations to implement the program 230 and perform the methods/operations described herein according to embodiments.

An execution screen of the program 230 may be displayed on a display 240. Although the display 240 is illustrated as a separate device connected to the computing device 200 in FIG. 2, the display 240 may be one of the components of the computing device 200 in the case that the computing device 200 is a portable terminal of a user, such as a smartphone, a tablet, and the like. The screen displayed on the display 240 may be a state before information is input to the program 230 or may be an execution result of the program 230.

Figure 3:
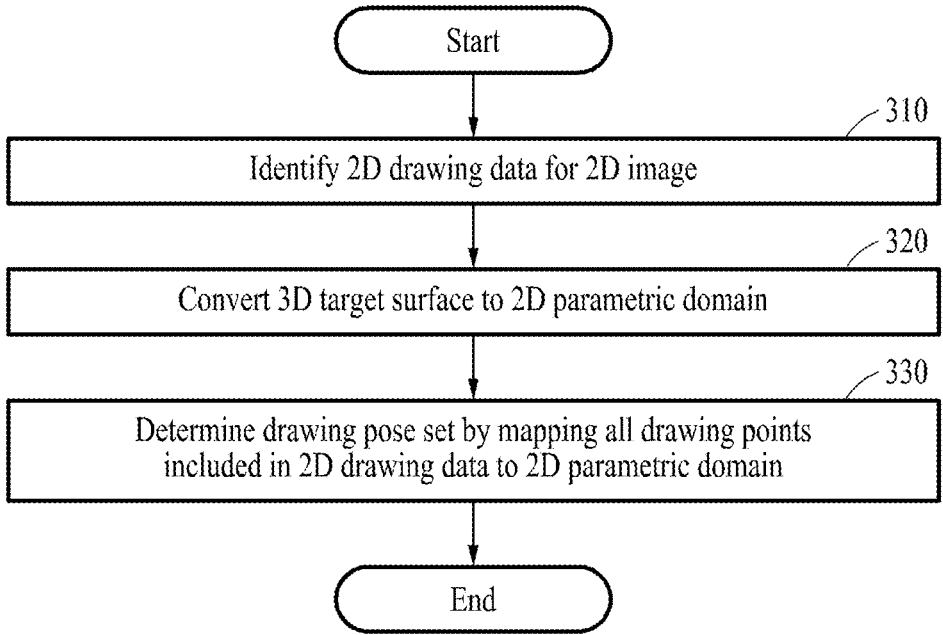
FIG. 3 is a diagram illustrating a method of identifying a drawing pose set for a manipulator included in a robot in order to draw a two-dimensional (2D) image on a three-dimensional (3D) target surface, according to an embodiment.

FIG. 3 is a diagram illustrating a method of identifying a drawing pose set for a manipulator included in a robot in order to draw a 2D image on a 3D target surface, according to an embodiment.

The method of identifying a drawing pose set, illustrated in FIG. 3, may be performed by the processor 210 of the computing device 200 shown in FIG. 2. In operation 310, the processor 210 may identify 2D drawing data $\mathcal{D}$ for a 2D image. More specifically, the processor 210 may collect drawing points for the 2D image from a user device including a pen interface, such as a tablet or a mobile phone, through a vector graphics engine. Here, each of the collected drawing points for the 2D image may include information on pen pressure.

In operation 320, the processor 210 may convert the 3D target surface to a 2D parametric domain. To render the 2D image on the 3D target surface using robot motion, a depth of each of the drawing points included in the 2D drawing data $\mathcal{D}$ may need to be determined.

To this end, the processor 210 may parameterize 3D surface data S into a 2D parametric domain $\Omega$ through a parameterization function $\psi$ using conformal mapping, which is one of surface parameterization techniques that preserve both an angle and a shape.

Figure 4:
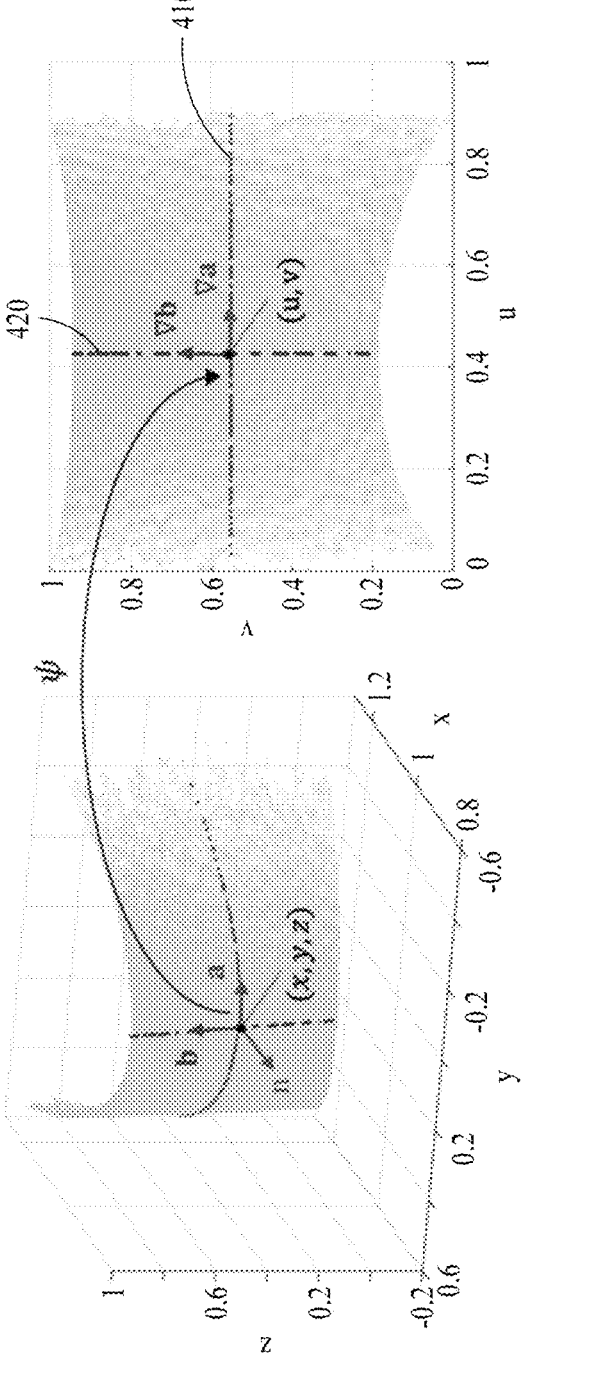
FIG. 4 is a diagram illustrating a method of mapping 3D surface data to a 2D parametric domain, according to an embodiment.

Referring to FIG. 4, the parameterization function $\psi$ through which the 3D surface data S may be mapped to the 2D parametric domain $\Omega$ may be referred to as being conformal when vectors that tangent along a horizontal line 410 and a vertical line 420 intersect at the 3D surface data S and have an identical normal, wherein the horizontal line 410 and the vertical line 420 may be orthogonal to each other and may form a regular grid for each $(u,v)\in\Omega$.

$$a = n \times b \qquad \text{[Equation 1]}$$

Here, a and b denotes tangent vectors, and n denotes a unit normal of $(x,y,z)\in S$. In other words, conformal mapping may be a local similarity conversion and may convert a basic circle on a plane to a basic circle of a (u,v) area.

In operation 330, the processor 210 may determine the drawing pose set by mapping all drawing points included in the 2D drawing data $\mathcal{D}$ to the 2D parametric domain $\Omega$. The 3D surface data S may be a set of unorganized/sparse surface points and may not necessarily form a uniform grid.

In other words, since all drawing points included in the 2D drawing data $\mathcal{D}$ may not be mapped to the 2D parametric domain $\Omega$, the processor 210 may perform bilinear interpolation in the 2D parametric domain $\Omega$ and estimate (u,v) coordinates of the 2D drawing data $\mathcal{D}$.

First, when the 3D surface data S of the 3D target surface and the corresponding 2D parametric domain $\Omega$ are given, the processor 210 may store the 3D surface data S as a quadtree data structure. The processor 210 may calculate a parametric scale in the 2D parametric domain $\Omega$ along with a desired drawing scale and may match the 2D drawing data $\mathcal{D}$ to the 2D parametric domain $\Omega$.

Figure 5:
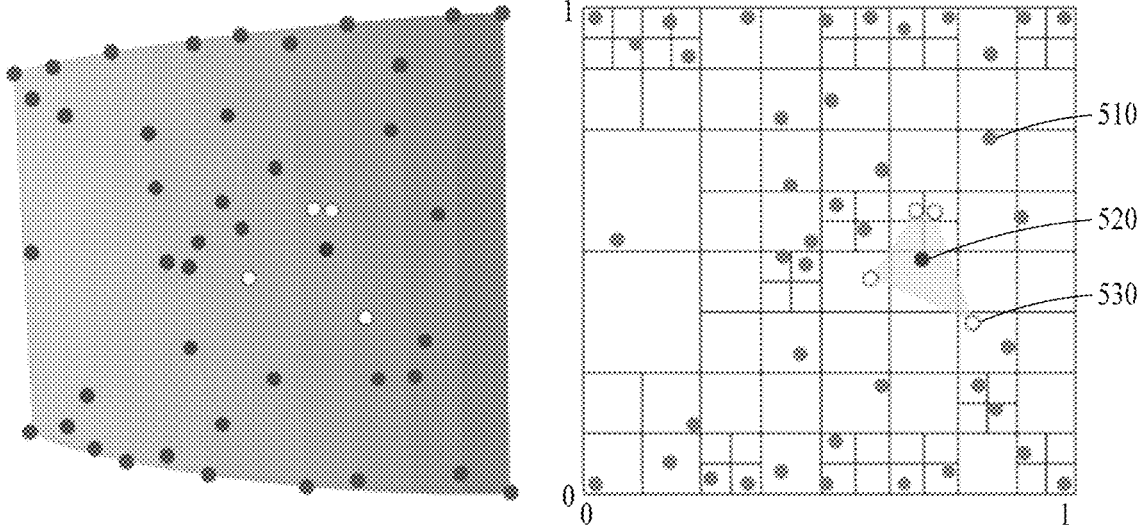
FIG. 5 is a diagram illustrating a method of mapping 2D drawing data to a 2D parametric domain, according to an embodiment.

For example, referring to FIG. 5, first points 510 may indicate matching drawing points, for which mapping has been completed to the 2D parametric domain $\Omega$, among the drawing points included in the 2D drawing data $\mathcal{D}$. On the contrary, a second point 520 may indicate a missing drawing point, which has not been mapped to the 2D parametric domain, among the drawing points included in the 2D drawing data $\mathcal{D}$ The processor 210 may identify, for the second point 520, four nearest matching drawing points 530 that form a quadrilateral in the 2D parametric domain $\Omega$.

The processor 210 may parameterize a location $p_i$ of the 3D surface data S and $d_i$ mapped to a surface normal $n_i$ by applying bilinear interpolation to the quadrilateral. Through this, the processor 210 may determine a drawing pose set $\mathcal{D}'$ consisting of drawing points mapped to the 3D target surface along with a corresponding surface direction, as shown in Equation 2 below.

$$\mathcal{D}' = \{\langle p_i, r_i\rangle | p_i \in \mathbb{R}^3, r_i \in SO(3)\} \qquad \text{[Equation 2]}$$

Here, $r_i$ is a parameter related to orientation, or rotation, of an end portion of the robot. For ease of description, it is assumed herein that all positions and coordinates are calculated based on the World frame.

Figure 6:
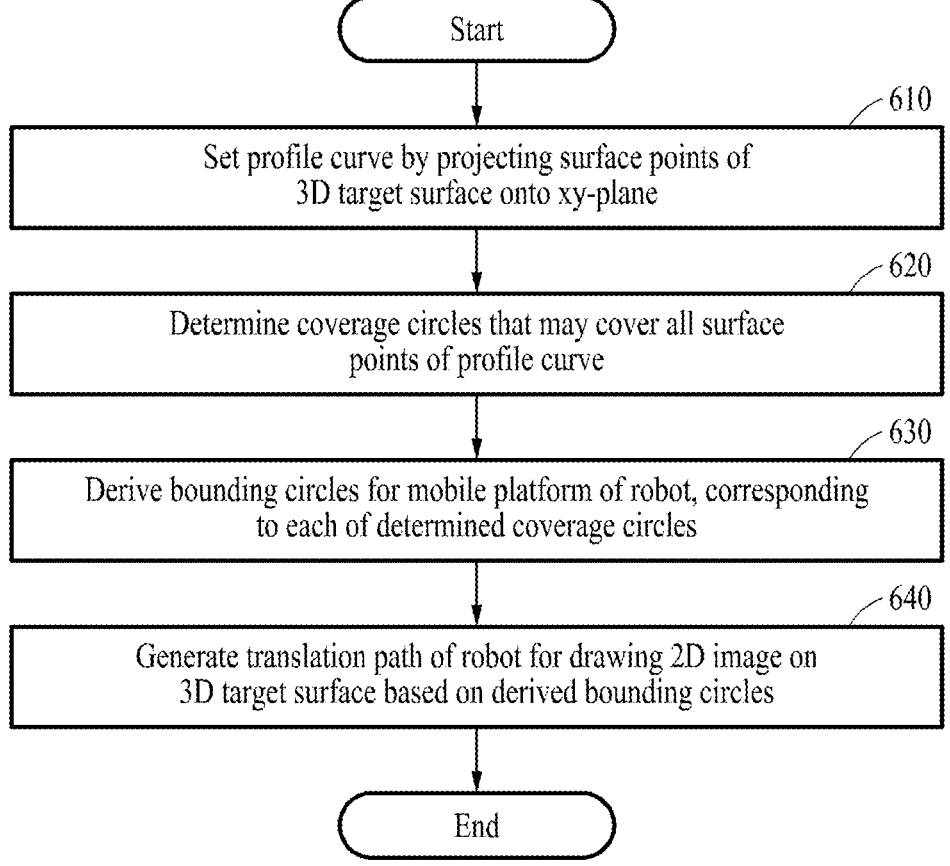
FIG. 6 is a diagram illustrating a method of generating a robot path, according to an embodiment.

FIG. 6 is a diagram illustrating a method of generating a robot path, according to an embodiment.

The method of generating a robot path, shown in FIG. 6, may be performed by the processor 210 of the computing device 200 shown in FIG. 2. Since the mobile platform included in the robot may move freely, a size of a 3D target surface on which a 2D image is drawn may not be limited. Thus, when the size of the 3D target surface is large, the processor 210 may generate a translation path of the robot that may cover the entire drawing pose set $\mathcal{D}'$ To this end, the processor 210 may define concepts of reachability and coverage of the robot. First, when a robot $\mathcal{R}$ having a forward kinematics map $\mathcal{F}_\mathcal{R}$ is given, reachability $\mathcal{L}_\mathcal{R}$ (c) for a configuration c$\in$ SE(3) representing a position of the robot may be defined as a mapping from SE(3) to {0, 1}. In other words, the reachability may correspond to (1) when q exists such that $\mathcal{F}_\mathcal{R}$ (q)=c for $\exists q \in \mathcal{C}$, and may correspond to (0) otherwise. Here, $\mathcal{C}$ denotes a configuration space of the robot.

In addition, coverage $\mathcal{C}$ of the robot $\mathcal{R}$ having reachability $\mathcal{L}_\mathcal{R}$ may be defined as a set of points that an end effector of the robot may reach, as shown in Equation 3 below.

$$C = \{\forall \, p \in \mathbb{R}^3 | \exists \, q \in C, \exists \, r \in SO(3), \mathcal{L}_{\mathcal{R}(q)}(\langle p, r \rangle) = 1\} \quad \text{[Equation 3]}$$

Here, $\mathcal{R}$(q) indicates the robot $\mathcal{R}$ disposed in a configuration q.

The processor 210 may additionally define a concept of a coverage map based on the coverage $\mathcal{C}$ When a base frame $p_{base} \in$ SE(2) of a mobile platform included in the robot $\mathcal{R}$ is limited to the configuration space $\mathcal{C}$, a coverage map $\mathcal{M}$ of the robot $\mathcal{R}$ having the reachability $\mathcal{L}_{\mathcal{R}}$ may be defined as a set of points that an end effector of the robot $\mathcal{R}$ may reach.

Figure 7A:
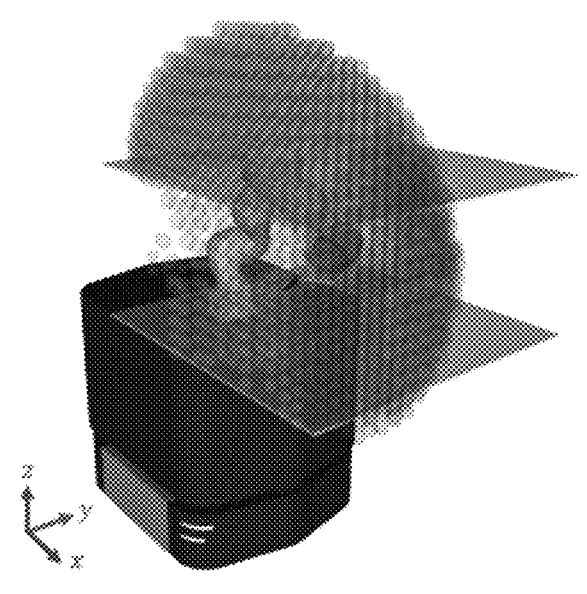
FIGS. 7A and 7B are diagrams illustrating a coverage map of a manipulator according to an embodiment.

FIG. 7A shows the coverage map $\mathcal{M}$ of the robot $\mathcal{R}$, wherein the sphere may correspond to each component of the coverage map $\mathcal{M}$ When a base frame $p_{base}$ is fixed, the coverage map $\mathcal{M}$ may be a discretized version of $\mathcal{C}_i$ which represents a subset of the coverage $\mathcal{C}$ of the robot $\mathcal{R}$ In general, a geometric structure of $\mathcal{C}_i$ may be highly convex and may contain a hole due to a kinematic limitation. A simple geometric primitive such as a sphere may not be close to the $\mathcal{C}_i$ of a complex geometric structure. However, a sphere is selected as a geometric approximate value because the simplicity of the sphere may relieve the burden of a reachability test. In addition, a spherical approximate value using the coverage map $\mathcal{M}$ may have an advantage of quickly finding reachable points on a 3D target surface.

Figure 7B:
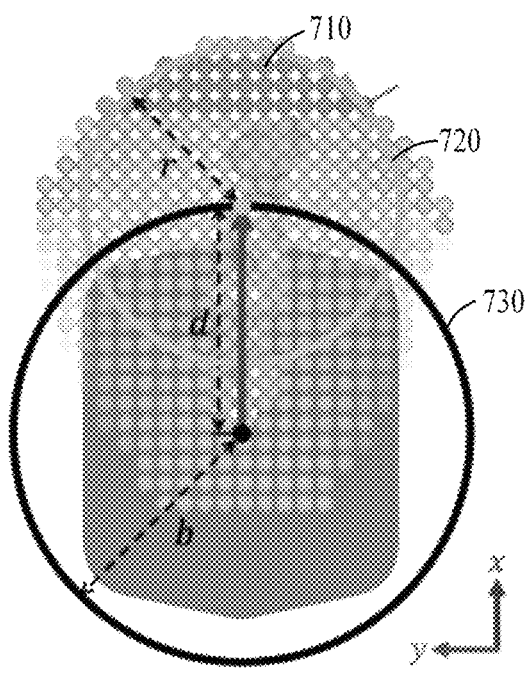
Figures 8A, 8B, 8C:
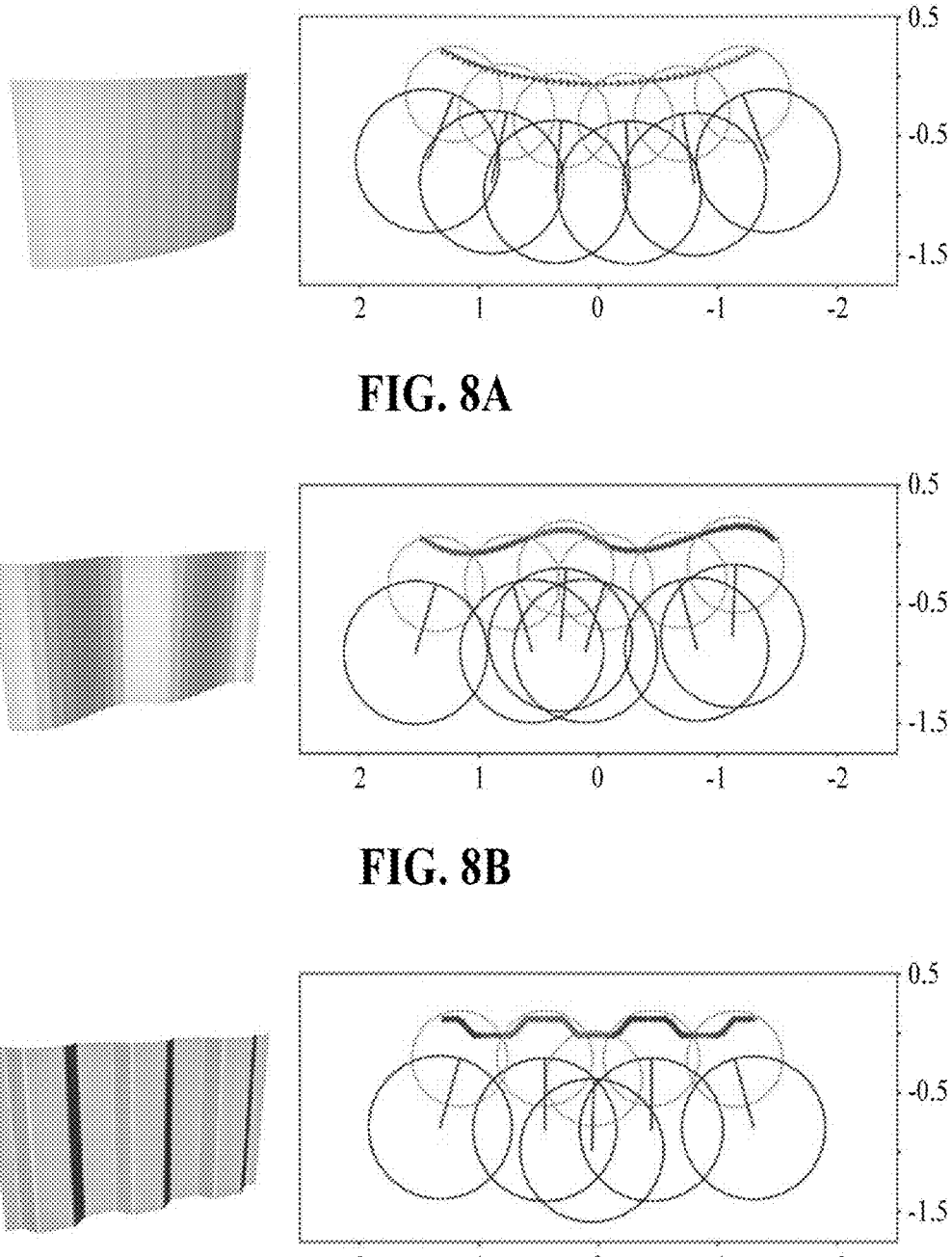
FIGS. 8A, 8B, and 8C are diagrams illustrating three models of a 3D target surface according to an embodiment.

The processor 210 may assume a geometric characteristic of the 3D target surface and may reduce a dimension of the coverage map $\mathcal{M}$ from 3D to 2D, as shown in FIG. 7B. For example, the geometric characteristic of the 3D target surface may be assumed to be a protruding surface as shown in FIG. 8A, FIG. 8B and FIG. 8C, and the protruding surface may be assumed to protrude vertically along the z-axis from a profile curve S', which is a 2D plane curve defined in the xy-plane. Thus, since the geometric characteristic of the 3D target surface may still be related to the profile curve S', the processor 210 may project a spherical range of $\mathcal{C}_i$ onto a 2D circle.

In addition, the processor 210 may check a collision between the robot $\mathcal{R}$ and the 3D target surface using another 2D circle (e.g., a bounding circle $B_i$). When the bounding circle $B_i$ is used, not only a mobile platform may be maintained without colliding with the 3D target surface, but also a geometric characteristic may be approximated as a sphere, and accordingly, an unreachable area may be corrected. More specifically, when the bounding circle $B_i$ is introduced, a final coverage of the robot $\mathcal{R}$ may be identical to $\mathcal{C}_i - B_i$. Accordingly, parts created by overestimating reachable parts of the robot $\mathcal{R}$ oto be a sphere may be excluded by an intersection of $\mathcal{C}_i$ and $B_i$, and the overestimated parts may be corrected.

The processor 210 may determine the geometric structure of the circle representing the coverage circle $\mathcal{C}_i$ in 2D and the bounding circle $B_i$ of the mobile platform, as shown in FIG. 7B, and may calculate a distance d between centers of $\mathcal{C}_i$ and $B_i$. Here, the following results may be observed in a cell geometric distribution of the pre-calculated coverage map $\mathcal{M}$ 1) An overall discrete shape of the coverage map $\mathcal{M}$ may be similar to a spherical shell, and an inner shell may correspond to an area the manipulator cannot reach.

2) An orientation of the mobile platform may be specified so that a drawing of the manipulator may occur only in the direction of the x-axis of the base frame. Thus, a main radial direction of the coverage map $\mathcal{M}$ may be aligned with the x-axis, and a radial range may be limited.

3) It may be assumed that a vertical height of the 3D target surface is limited along the z-axis. Thus, the coverage map $\mathcal{M}$ may be cut by a slab defined by the vertical height.

A geometric structure of the coverage map $\mathcal{M}$ projected onto the xy-plane is shown in FIG. 7B, and the processor 210 may bind only the first several consecutive rows (e.g., 710) using a circle on the coverage map $\mathcal{M}$ based on the observation results described above. Here, the processor 210 may determine the coverage circle $\mathcal{C}_i$ (e.g., 720) using a constraint condition that a limit point of the consecutive rows and the center of the circle are aligned on the x-axis.

For example, the processor 210 may cut out unnecessary portions (e.g., outer portions of the gray plane) according to a predetermined target drawing height. The processor 210 may select columns that include all consecutive points (e.g., 710) from among the spheres corresponding to each element of the cut coverage map, wherein the y-axis is a row and the x-axis is a column. The processor 210 may obtain the coverage circle $\mathcal{C}_i$ (e.g., 720) by selecting an outermost sphere from among the selected spheres (e.g., 710) and calculating a circle centered on a center of the x-axis.

In addition, the processor 210 may also calculate the bounding circle $B_i$ (e.g., 730) with a portion of safety offset in response to the mobile platform. Here, the bounding circle may indicate a circle that includes the entire mobile platform from the center of the mobile platform, and the distance between the center and a farthest point may be the radius.

The processor 210 may also obtain a distance d between centers of the coverage circle $\mathcal{C}_i$ and the bounding circle $B_i$. The distance d between the centers of the coverage circle $\mathcal{C}_i$ and the bounding circle $B_i$ may be used thereafter to determine a position of the bounding circle $B_i$ with respect to a position of the coverage circle $C_i$ determined according to a path generation algorithm.

Here, instead of using $C_i$ only, $C_i - B_i$ may be used to better approximate a spherical shell geometry of the coverage map $\mathcal{M}$ wherein "−" may mean a Boolean difference.

The processor 210 may generate an optimal translation path of the robot by using the above parameters.

First, in operation 610, the processor 210 may set a profile curve S' by projecting surface points of a 3D target surface onto the xy-plane.

In operation 620, the processor 210 may determine the coverage circles $C_i$ that may cover all surface points of the profile curve S'. To this end, the processor 210 may randomly identify a plurality of coverage circle candidates that may cover all of the surface points of the profile curve S'.

Figure 9:
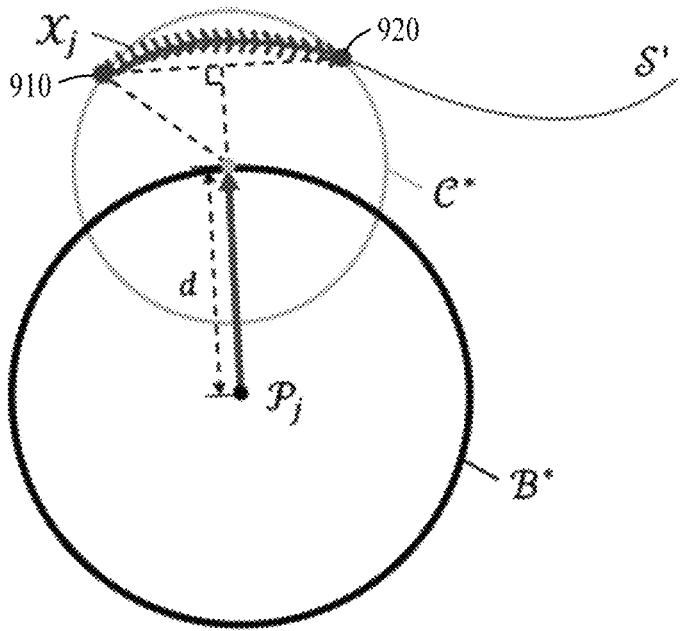
FIG. 9 is a diagram illustrating a method of determining a coverage circle and a bounding circle, according to an embodiment.

Referring to FIG. 9, the processor 210 may select, from among the identified plurality of coverage circle candidates, a coverage circle candidate $C^*$ that includes the most surface points of the profile curve S'. A set of all surface points in the coverage circle candidate $C^*$ may be expressed as $X_j = C^* \cap S'$.

In operation 630, the processor 210 may obtain the bounding circle B* corresponding to the coverage circle candidate $C^*$ and a configuration $\mathcal{P}_j$ of the mobile platform of the robot. Here, $\mathcal{P}_j$ may be calculated by moving in a direction perpendicular to a line connecting two endpoints of $X_j$. More specifically, the processor 210 may determine a position, which is at a distance d from a center of the coverage circle candiate $C^*$ in a direction perpendicular to a straight line connecting two endpoints (e.g., 910, 920) among the surface points $X_j$ that are covered by the coverage circle candidate $C^*$, to be a position of the configuration $\mathcal{P}_j$ of the mobile platform.

After confirming that the mobile platform of the robot does not collide with the 3D target surface when the robot is disposed on $\mathcal{P}_j$ the processor 210 may add $X_j$ to X, which is a set of points that have already been covered, and may iterate the process until a sum of $X_j$ includes all of the surface points of the profile curve S'.

In operation 640, the processor 210 may generate a translation path of the robot for drawing a 2D image on the 3D target surface based on the derived bounding circles. More specifically, the processor 210 may obtain, as a result of the iteration process, a tuple $T_j = \langle \mathcal{P}_j, X_j \rangle$ consisting of a basic pose $\mathcal{P}_j$ of the robot and a set $X_j$ of the surface points covered by the basic pose $\mathcal{P}_j$ of the robot.

Here, the processor 210 may generate a line connecting the basic pose $\mathcal{P}_j$ of the robot as the translation path of the robot.

The examples described herein may be implemented using hardware components, software components, and/or combinations thereof. A processing device may be implemented using one or more general-purpose or special-purpose computers, such as, for example, a processor, a controller, an arithmetic logic unit (ALU), a digital signal processor (DSP), a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device may also access, store, manipulate, process, and create data in response to execution of the software. For purpose of simplicity, the description of a processing device is used as singular. However, one of ordinary skill in the art will appreciate that a processing device may include multiple processing elements and/or multiple types of processing elements. For example, a processing device may include a plurality of processors, or a single processor and a single controller. In addition, a different processing configuration is possible, such as one including parallel processors.

The software may include a computer program, a piece of code, an instruction, or some combination thereof, to independently or collectively instruct or configure the processing device to operate as desired. The software and/or data may be stored in any type of machine, component, physical or virtual equipment, or computer storage medium or device for the purpose of being interpreted by the processing device or providing instructions or data to the processing device. The software may also be distributed over network-coupled computer systems so that the software is stored and executed in a distributed fashion. The software and data may be stored in a non-transitory computer-readable recording medium.

The methods according to the above-described examples may be recorded in non-transitory computer-readable media including program instructions to implement various operations of the above-described examples. The media may also include the program instructions, data files, data structures, and the like alone or in combination. The program instructions recorded on the media may be those specially designed and constructed for the examples, or they may be of the kind well-known and available to those having skill in the computer software arts. Examples of non-transitory computer-readable media include magnetic media such as hard disks, floppy disks, and magnetic tape; optical media such as compact disc read-only memory (CD-ROM) and a digital versatile disc (DVD); magneto-optical media such as floptical disks; and hardware devices that are specially configured to store and perform program instructions, such as read-only memory (ROM), RAM, flash memory, and the like. Examples of program instructions include both machine code, such as those produced by a compiler, and files containing higher-level code that may be executed by the computer using an interpreter.

The above-described hardware devices may be configured to act as one or more software modules in order to perform the operations of the above-described examples, or vice versa.

Although the examples have been described with reference to the limited number of drawings, it will be apparent to one of ordinary skill in the art that various technical modifications and variations may be made in the examples without departing from the spirit and scope of the claims and their equivalents. For example, suitable results may be achieved if the described techniques are performed in a different order, and/or if components in a described system, architecture, device, or circuit are combined in a different manner and/or replaced or supplemented by other components or their equivalents.

Therefore, other implementations, other examples, and equivalents to the claims are also within the scope of the following claims.

What is claimed is:

1. A method of generating a robot path, the method comprising:

identifying a drawing pose set for a manipulator included in a robot in order to draw a two-dimensional (2D) image on a three-dimensional (3D) target surface;

setting a profile curve by projecting surface points of the 3D target surface onto an xy-plane;

determining coverage circles of the manipulator that are capable of covering all surface points of the profile curve;

deriving bounding circles for a mobile platform of the robot mounting the manipulator, corresponding to each of the determined coverage circles; and generating a translation path of the robot for drawing the 2D image on the 3D target surface based on the derived bounding circles.

2. The method of claim 1, wherein the identifying of the drawing pose set comprises:

identifying 2D drawing data for the 2D image;

converting the 3D target surface to a 2D parametric domain;

mapping all drawing points included in the 2D drawing data to the 2D parametric domain; and determining the drawing post set of the manipulator by inverting the 2D parametric domain to which all of the drawing points are mapped to the 3D target surface.

3. The method of claim 2, wherein the mapping of all of the drawing points to the 2D parametric domain comprises:

identifying, corresponding to a missing drawing point of the 2D drawing data, four nearest matching drawing points that form a quadrilateral in the 2D parametric domain, wherein the missing drawing point is a point that is not mapped to the 2D parametric domain; and determining the drawing post set for the manipulator of the robot by parameterizing the missing drawing point by applying bilinear interpolation to a quadrilateral formed by the identified four nearest matching drawing points.

4. The method of claim 1, wherein the determining of the coverage circles of the manipulator comprises:

identifying a plurality of coverage circle candidates that is capable of covering all of the surface points of the profile curve; and selecting final coverage circles for generating the robot path from among the identified plurality of coverage circle candidates based on a number of surface points of the profile curve included in each of the identified plurality of coverage circle candidates.

5. The method of claim 1, wherein the deriving of the bounding circles comprises:

determining a center of a bounding circle for the mobile platform to be in a direction perpendicular to a line connecting two endpoints among surface points of the profile curve included in each of the determined coverage circles.

6. The method of claim 5, wherein, in the mobile platform, a pose direction is determined based on the direction perpendicular to the line connecting the two endpoints.

7. The method of claim 1, wherein the generating of the translation path of the robot comprises:

determining a line connecting centers of each of the derived bounding circles for the mobile platform to be the translation path of the robot.

8. A method of generating a robot path, the method comprising:

identifying a drawing pose set for a manipulator included in a robot in order to draw a two-dimensional (2D) image on a three-dimensional (3D) target surface;

setting a profile curve by projecting surface points of the 3D target surface onto an xy-plane;

identifying a plurality of coverage circle candidates that is capable of covering all surface points of the profile curve;

selecting, from among the identified plurality of coverage circle candidates, a first coverage circle candidate that comprises a greatest number of surface points of the profile curve;

selecting a second coverage circle candidate that comprises a greatest number of surface points among surface points of the profile curve other than surface points included in the first coverage circle candidate;

iterating the selecting of the first and second coverage circle candidates until coverage circle candidates capable of covering all of the surface points of the profile curve are selected;

deriving bounding circles for a mobile platform of the robot mounting the manipulator, corresponding to each of final coverage circles selected through the iteration; and generating a translation path of the robot for drawing the 2D image on the 3D target surface based on the derived bounding circles.

9. The method of claim 8, wherein the identifying of the drawing pose set comprises:

identifying 2D drawing data for the 2D image;

converting the 3D target surface to a 2D parametric domain;

mapping all drawing points included in the 2D drawing data to the 2D parametric domain; and determining the drawing post set of the manipulator by inverting the 2D parametric domain to which all of the drawing points are mapped to the 3D target surface.

10. The method of claim 8, wherein the deriving of the bounding circles comprises:

determining a center of a bounding circle for the mobile platform to be in a direction perpendicular to a line connecting two endpoints among surface points of the profile curve included in each of the determined coverage circles.

11. The method of claim 10, wherein, in the mobile platform, a pose direction is determined based on the direction perpendicular to the line connecting the two endpoints.

12. A computing device comprising:

at least one processor; and a memory configured to load or store a program executed by the processor, wherein the program comprises instructions that, when executed by the processor, cause the processor to:

identify a drawing pose set for a manipulator included in a robot in order to draw a two-dimensional (2D) image on a three-dimensional (3D) target surface;

set a profile curve by projecting surface points of the 3D target surface onto an xy-plane;

determine coverage circles of the manipulator that are capable of covering all surface points of the profile curve;

derive bounding circles for a mobile platform of the robot mounting the manipulator, corresponding to each of the determined coverage circles; and generate a translation path of the robot for drawing the 2D image on the 3D target surface based on the derived bounding circles.

13. The computing device of claim 12, wherein the processor is configured to:

identify 2D drawing data for the 2D image;

convert the 3D target surface to a 2D parametric domain;

map all drawing points included in the 2D drawing data to the 2D parametric domain; and determining the drawing post set of the manipulator by inverting the 2D parametric domain to which all of the drawing points are mapped to the 3D target surface.

14. The computing device of claim 13, wherein the processor is configured to:

identify, corresponding to a missing drawing point of the 2D drawing data, four nearest matching drawing points that form a quadrilateral in the 2D parametric domain, wherein the missing drawing point is a point that is not mapped to the 2D parametric domain; and determining the drawing post set for the manipulator of the robot by parameterizing the missing drawing point by applying bilinear interpolation to a quadrilateral formed by the identified four nearest matching drawing points.

15. The computing device of claim 12, wherein the processor is configured to:

identify a plurality of coverage circle candidates that is capable of covering all of the surface points of the profile curve; and select final coverage circles for generating the robot path among the identified plurality of coverage circle candidates based on a number of surface points of the profile curve included in each of the identified plurality of coverage circle candidates.

16. The computing device of claim 12, wherein the processor is configured to:

determine a center of a bounding circle for the mobile platform to be in a direction perpendicular to a line connecting two endpoints among surface points of the profile curve included in each of the determined coverage circles.

17. The computing device of claim 16, wherein, in the mobile platform, a pose direction is determined based on the direction perpendicular to the line connecting the two endpoints.

18. The computing device of claim 12, wherein the processor is configured to:

determine a line connecting centers of each of the derived bounding circles for the mobile platform to be the translation path of the robot.

* * * * *